(12) United States Patent
Yoneyama

(10) Patent No.: US 6,572,510 B1
(45) Date of Patent: Jun. 3, 2003

(54) CONTROL DEVICE OF AUTOMATIC TRANSMISSION

(75) Inventor: Nobuyuki Yoneyama, Puji (JP)

(73) Assignee: Jatco Transtechnology Ltd. (JP)

(*) Notice: Subject to any disclaimer, the term of this patent is extended or adjusted under 35 U.S.C. 154(b) by 0 days.

(21) Appl. No.: 10/031,891

(22) PCT Filed: May 18, 2001

(86) PCT No.: PCT/JP01/04167

§ 371 (c)(1),
(2), (4) Date: Jan. 22, 2002

(87) PCT Pub. No.: WO01/90606

PCT Pub. Date: Nov. 29, 2001

(30) Foreign Application Priority Data

May 22, 2000 (JP) ........................................ 2000-150456

(51) Int. Cl.⁷ ............................................... B60K 41/04
(52) U.S. Cl. ........................ 477/107; 477/117; 477/143; 477/156; 701/66
(58) Field of Search ................................ 477/107, 116, 477/117, 143, 150, 156, 158; 701/51, 56, 61, 64, 66

(56) References Cited

U.S. PATENT DOCUMENTS

| 5,131,294 A | * | 7/1992 | Yoshimura | 477/109 |
| 5,267,491 A | * | 12/1993 | Sumimoto et al. | 477/155 |
| 5,662,551 A | * | 9/1997 | Kamada | 477/152 |

* cited by examiner

*Primary Examiner*—Sherry Estremsky
*Assistant Examiner*—Tisha D. Lewis
(74) *Attorney, Agent, or Firm*—Rossi & Associates

(57) ABSTRACT

In a process wherein a before-shifting gear ratio Gx changes to a gear ratio of the target gear position, an actual shift time is measured by regarding as a shift starting point an earlier one between a time point when the present gear ratio G has repeated decreasing by a value equal to or larger than a predetermined unit gear ratio ΔG a predetermined number of times N and a time point when the present gear ratio reaches a first gear ratio G1 that is set to a value smaller than the gear ratio Gx by a predetermined value. If the gear ratio changes rapidly, the start of shifting can be detected at a time tsl when the present gear ratio G reaches the gear ratio G1, and if the gear ratio changes slowly, the start of shifting can be detected at a time ts4 when the gear ratio has repeated decreasing by a value equal to or larger than a predetermined unit gear ratio a predetermined number of times N.

11 Claims, 6 Drawing Sheets

CONTROL DEVICE OF AUTOMATIC TRANSMISSION

TECHNICAL FIELD

This invention relates generally to a control device of an automatic transmission for vehicles, and more particularly to a control device of an automatic transmission that provides learning control to enable completion of shifting in a predetermined period of time.

BACKGROUND ART

An automatic transmission changes gear positions by selectively actuating friction engagement elements such as clutches and brakes of a transmission gear mechanism by oil pressure. In this case, after the output of a shifting command, it takes much time to supply oil pressure to the selected friction engagement elements and the like, and thus, the start of the actual shifting in which the friction engagement elements start operating is delayed from a time indicated by the shifting command.

To change gear positions smoothly and quickly when controlling an automatic transmission, Japanese Laid-Open Patent Publication No. 1-193445, for example, proposes correcting an oil pressure in the next shifting based on the present shift time by learning control so that the actual shift time can be equal to a predetermined time.

Conventionally, to measure the shift time, a shift start determination gear ratio G1 is set in advance between a before-shifting gear ratio (the gear ratio of a before-shifting gear position) Gx and an after-shifting gear ratio (the gear ratio of a after-shifting gear position) Gy. A time point when the sequentially detected gear ratio crosses the shift start determination gear ratio G1 is regarded as a time point when the shifting is started, and a period of time until the gear ratio reaches a shift end determination gear ratio G3 set in the same manner as the gear ratio G1 is regarded as the shift time.

Incidentally, since the actual shifting starts when the gear ratio starts changing even at a low rate, the above-mentioned shift start determination gear ratio G1 is preferably set to a value as much close to the before-shifting gear ratio Gx as possible. Actually, however, the gear ratio G1 is set to a value smaller than the before-shifting gear ratio by a predetermined value in terms of dispersion in detection.

However, if the shift start determination gear ratio G1 is set to a value that is smaller than the before-shifting gear ratio Gx to a degree as mentioned above, the measured time is affected by a period of time until the gear ratio G1 is reached.

If, for example, an oil pressure in shifting is low and a change in gear ratio is extremely small at the start of shifting as indicated by "a" in FIG. 6, there is a great difference between the actual shift time and the measured shift time. Even if the measured time is learned, it is impossible to properly correct an oil pressure in the next shifting.

More specifically, if it is determined that the measured shift time is shorter than a predetermined of time even though the actual shift time is longer than the predetermined period of time, the oil pressure is corrected to decrease in the next shifting. This may cause a shift shock.

On the other hand, if an engine races during shifting due to the unmatched engagement and disengagement.of the friction engagement elements as shown by "b" in FIG. 6, the same phenomenon occurs since it takes much time for the gear ratio to cross the shift start determination gear ratio.

As stated above, in the conventional way of measuring the shift time, it is impossible to measure the actual shift time, which is important in learning control, with desirable accuracy.

It is therefore an object of the present invention to provide a control device of an automatic transmission, which is capable of finding a shift time with high accuracy to provide proper learning control even in the case where a gear ratio changes at an extremely low rate at the start of shifting or in the case where an engine races.

DISCLOSURE OF INVENTION

To attain the above-mentioned object, according to the first aspect of the present invention, there is provided a control device of an automatic transmission, which selectively supplies hydraulic oil pressure to a plurality of friction engagement elements to change a plurality of gear positions by engaging and disengaging the friction engagement elements in combinations, the control device comprising: an oil pressure regulating actuator for regulating the hydraulic oil pressure; shift time learning control means for performing shift time learning control by comparing a target shift time and an actual shift time to thereby control the oil pressure regulating actuator; and wherein the shift time learning control means comprises gear ratio calculating means for finding a present gear ratio, and shift time measuring means for measuring the actual shift time by determining that shifting is started if the present gear ratio has repeated decreasing by a value equal to or larger than a predetermined unit gear ratio a predetermined number of times.

In the shift time learning control for controlling hydraulic oil pressure in the automatic transmission, since the actual shift time is measured by regarding as a shift starting point a time point when the present gear ratio has repeated decreasing by a value equal to or larger than a predetermined unit gear ratio a predetermined number of times, it is possible to surely detect the start of shifting without fail even when the shifting proceeds slowly due to a low hydraulic oil pressure. In particular, a smaller unit gear ratio enables the start of shifting to be detected earlier at a time point closer to the actual shift starting point. This improves the shift time measuring accuracy, and thus provides proper shift time learning control without causing a shift shock.

According to the second aspect of the present invention, the actual shift time is measured by regarding as a shift starting point an earlier time point between a time point when the present gear ratio has repeated decreasing by a value equal to or larger than a predetermined unit gear ratio a predetermined number of times and a time point when the present gear ratio reaches a first gear ratio that is set to a value smaller than a before-shifting gear ratio by a predetermined value.

By determining not only whether or not the present gear ratio has repeated decreasing by a value equal to or larger than a predetermined unit gear ratio a predetermined number of times but also whether or not the present gear ratio has reached the first gear ratio, it is possible to detect the start of shifting before the present gear ratio reaches the first gear ratio as a result of sequential decreases within the range of the unit gear ratio or more in the case where the shifting proceeds slowly, and it is possible to early detect the start of shifting since the present gear ratio quickly reaches the first gear ratio in the case where the shifting proceeds fast.

According to the third aspect of the present invention, the actual shift time is measured by regarding as a shift starting point a time point when the present gear ratio reaches a second gear ratio that is set to a value larger than a before-shifting gear ratio by a predetermined value.

In the case of shifting in which an engine races after the start of the actual shifting, it is possible to detect the racing of the engine if the present gear ratio has reached the second gear ratio and to detect the start of shifting at a time point in proximity to the actual shift starting point.

According to the fourth aspect of the present invention, the actual shift time is measured by regarding as a shift starting point an earlier time point between a time point when the present gear ratio reaches a first gear ratio that is set to a value smaller than a before-shifting gear ratio by a predetermined value and a time point when the present gear ratio reaches a second gear ratio that is set to a value larger than the before-shifting gear ratio by a predetermined value.

If the engine races during shifting, it is possible to detect the start of shifting when the present gear ratio reaches the second gear ratio, and if the engine never races during shifting, it is possible to detect the start of shifting when the present gear ratio reaches the first gear ratio. In either case, it is possible to early detect the start of shifting.

According to the fifth aspect of the present invention, the actual shift time is measured by regarding as a shift starting point the earliest time point among a time point when the present gear ratio has repeated decreasing by a value equal to or larger than a predetermined unit gear ratio a predetermined number of times, a time point when the present gear ratio reaches a first gear ratio that is set to a value smaller than a before-shifting gear ratio by a predetermined value, and a time point when the present gear ratio reaches a second gear ratio that is set to a value larger than the before-shifting gear ratio by a predetermined value.

Since the start of shifting can be detected if the present gear ratio has repeated decreasing by a value equal to or larger than a predetermined unit gear ratio a predetermined number of times or if the present gear ratio has reached the first or second gear ratio, it is possible to detect the start of shifting at a time point in proximity to the actual shift starting point irrespective of whether the shifting proceeds fast or not.

It should be noted that the above-mentioned unit gear ratio is preferably set to a value smaller than a difference between the before-shifting gear ratio and the first gear ratio.

BEST MODE FOR CARRYING OUT THE INVENTION

The best mode of carrying out the present invention will now be described in detail with reference to the drawings showing an embodiment thereof.

Figure 1:
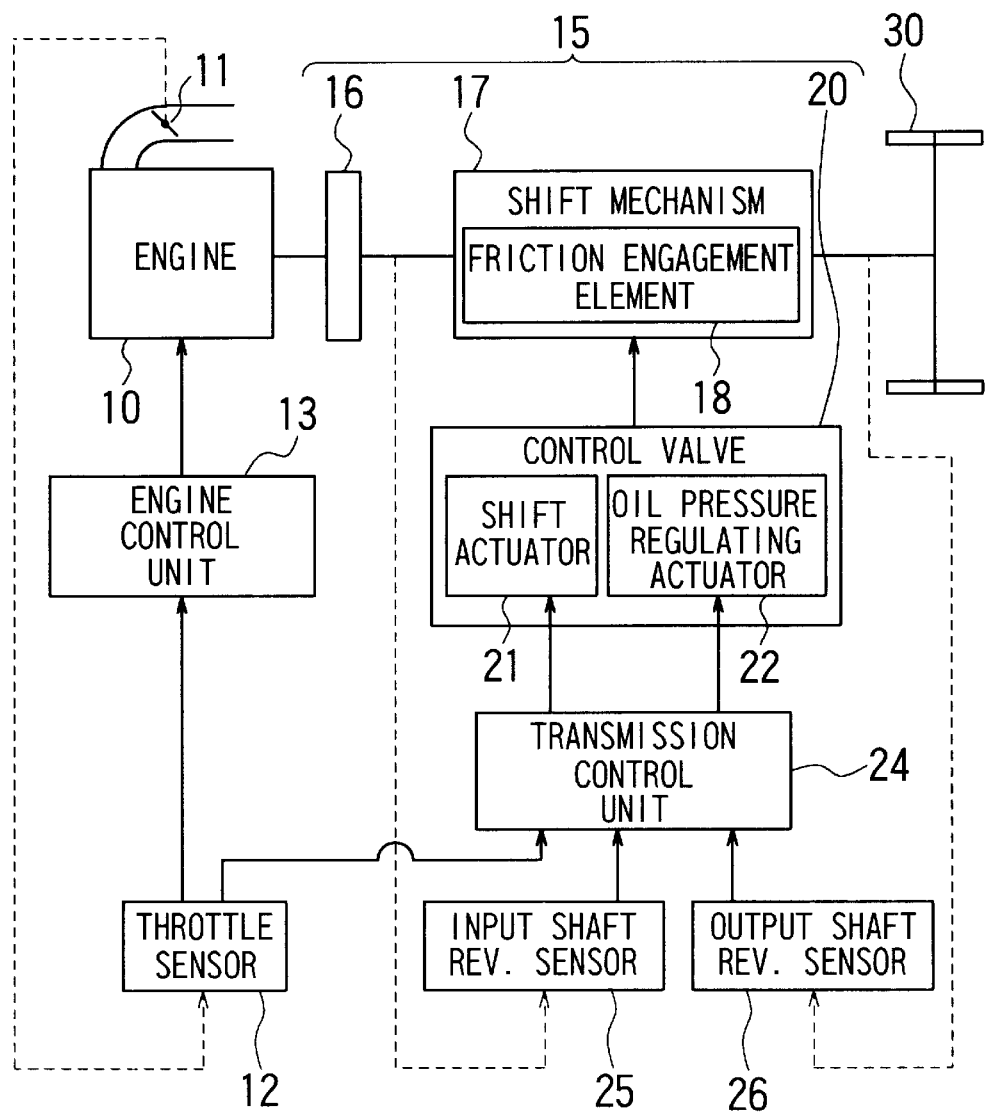
FIG. 1 is a diagram showing a power train control system for a vehicle according to an embodiment of the present invention.

FIG. 1 is a diagram showing a power train control system for a vehicle, in which a control device according to the embodiment is incorporated. In this power train control system, an output from an engine 10 is transmitted to a wheel 30 via an automatic transmission 15.

The engine 10 has a throttle valve 11 that is connected to an accelerator pedal, not shown, to be opened and closed. The engine 10 is controlled so as to acquire a predetermined output torque by an engine control unit 13 that receives a throttle valve opening (hereinafter referred to as "throttle opening") detected by a throttle sensor 12.

The automatic transmission 15 is comprised of a torque converter 16, a shift mechanism 17 including a plurality of friction engagement elements 18, and a control valve 20 that supplies and releases oil pressure to and from the friction engagement elements 18.

The control valve 20 uses an oil pump, not shown, as its oil pressure source, and is comprised of a shift actuator 21 that decides whether to supply hydraulic oil pressure and an oil pressure regulating actuator 22 that regulates an oil pressure value of hydraulic oil pressure. A transmission control unit 24 controls the control valve 20.

More specifically, the throttle sensor 12, an input revolution sensor 25, that detects an input shaft revolutionary speed Vin of the shift mechanism 17, and an output shaft revolution sensor 26 that detects an output shaft revolutionary speed Vout of the shift mechanism 17 are connected to the transmission control unit 24, which controls the control valve 20 according to information received from those sensors. The transmission control unit 24 selectively engages and disengages the friction engagement elements 18 according to the driving conditions of a vehicle to thus change a plurality of gear positions.

It should be noted that a vehicle speed Vs is found by multiplying the output shaft revolutionary speed Vout of the shift mechanism 17 by a predetermined coefficient.

Although not illustrated, the shift actuator 21 has a plurality of solenoids and shift valves, and changes the shift valves by turning on and off the solenoids to decide whether or not the hydraulic oil pressure will be supplied. The oil pressure regulating actuator 22 has a solenoid which is duty cycle controlled and a regulator valve, and applies a pilot pressure, which is obtained by controlling an on-off time ratio of an orifice by the solenoid, to the regulator valve to thus regulate an oil pressure. The arrangements of the shift actuator 21 and the oil pressure regulating actuator 22 are identical with those of components constituting a control valve in a conventional transmission.

When changing the gear positions, the transmission control unit 24 operates the shift actuator 21 and the oil pressure regulating actuator 22 while learning-controlling a shift time T so as to ensure smooth shifting by controlling the engagement or disengagement of the friction engagement elements 18 in a predetermined shift time (reference shift time) To.

According to the present embodiment, the start of shifting is detected by determining not only whether or not the gear ratio has reached a predetermined shift start determination gear ratio but also other changing conditions of the gear ratio so that the learning-controlled shift time T can be detected at a point in proximity to an actual shift starting point.

Figure 2:
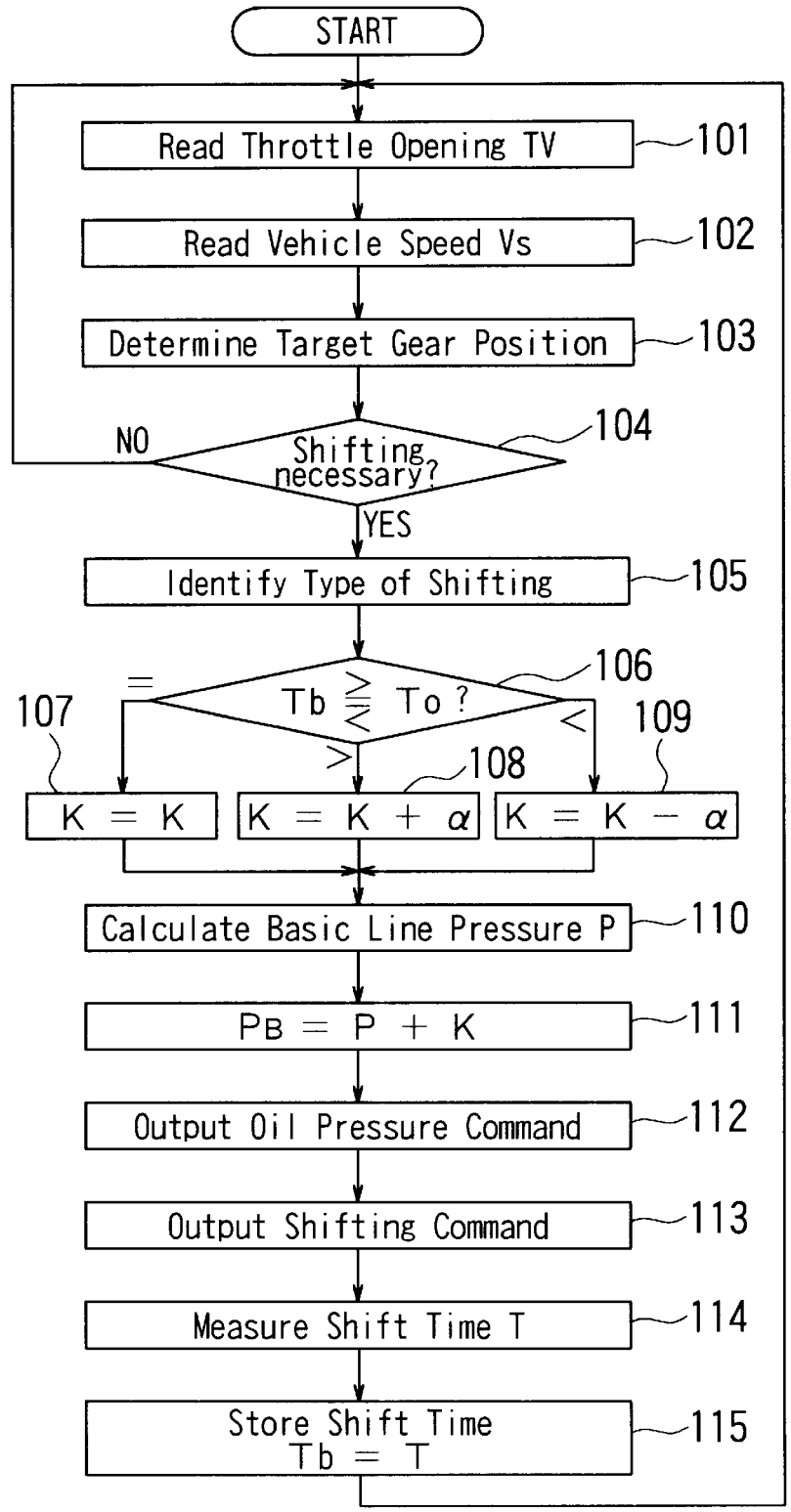
FIG. 2 is a main flow chart showing the procedure for carrying out a shift controlling operation according the embodiment.

FIG. 2 is a main flow chart showing the procedure for carrying out a shift controlling operation by the transmission control unit 24.

First, the throttle opening TV is read from the throttle sensor 12 in a step 101, and the vehicle speed Vs is read in a step 102. It should be noted that the vehicle speed is found by reading the output shaft revolutionary speed Vout from the output revolution sensor 26 as stated previously.

In a step 103, a target gear position is determined based on the throttle opening TV and the vehicle speed Vs according to a predetermined shift pattern.

In a step 104, whether the shifting is necessary or not is determined by comparing the target gear position determined in the previous step with the present gear position. If the target gear position corresponds to the present gear position, it is determined that the present gear position will be maintained and the program proceeds to the step 101.

If the shifting is necessary, the type of shifting i.e. from which gear position to which gear position is identified in a step 105, and the previous shift time Tb in the identified type of shifting stored by learning is compared with the predetermined reference shift time To in a step 106.

The reference shift time To has a predetermined time width, and if the previous shift time Tb lies in this time width, the program proceeds to a step 107 wherein an oil pressure correction coefficient K described later is maintained at K. If the previous shift time Tb is longer than the reference shift time To, the correction coefficient K is changed to K+ in a step 108, and if the previous shift time Tb is shorter than the reference shift time To, the correction coefficient K is changed to K− in a step 109.

After the correction coefficient is found, a basic line pressure P in shifting is calculated based on the throttle opening TV and the vehicle speed Vout in a step 110, and the correction coefficient K is added to the basic line pressure P to find an optimum oil pressure PB in a step 111.

Then, an oil pressure command for forming the optimum oil pressure PB is outputted to the oil pressure regulating actuator 22 in a step 112, and a shifting command S is outputted to the shift actuator 21 in a step 113.

In a next step 114, the present shift time T is measured, and in a step 115, the measured shift time is stored as the previous shift time Tb for the next shifting.

The program then returns to the step 101 to repeat the above described steps.

Figure 3:
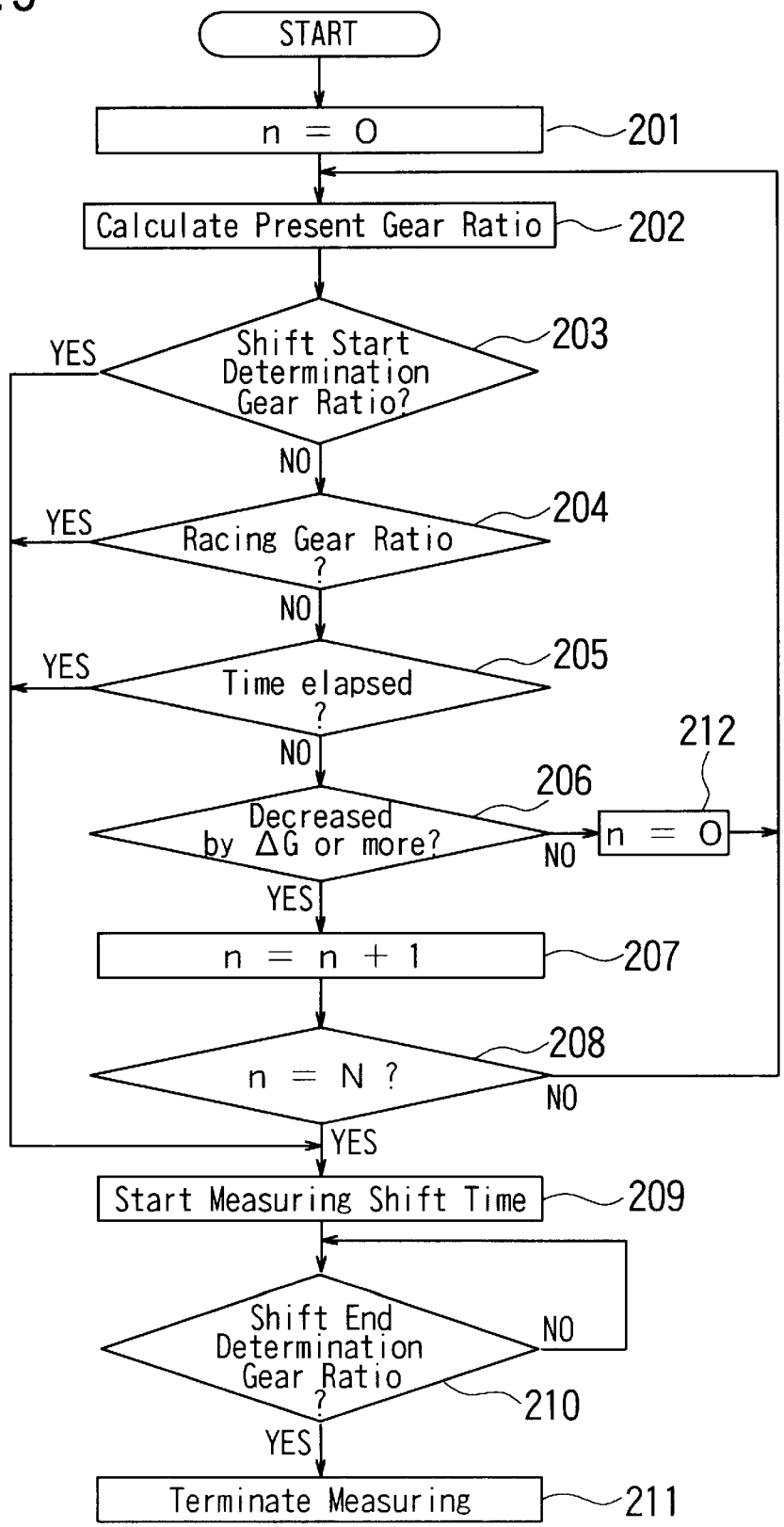
FIG. 3 is a flow chart showing the details of the procedure for measuring a shift time.

FIG. 3 is a flow chart showing the details of the procedure for measuring the shift time in the step 114.

First, in a step 201, a sequential number count n representing the number of sequential decreases in gear ratio as described later is set to 0.

In a step 202, the input shaft revolutionary speed Vin and the output shaft revolutionary speed Vout in the shift mechanism 17 are read to calculate the present gear ratio G (=Vout/Vin).

Figure 4:
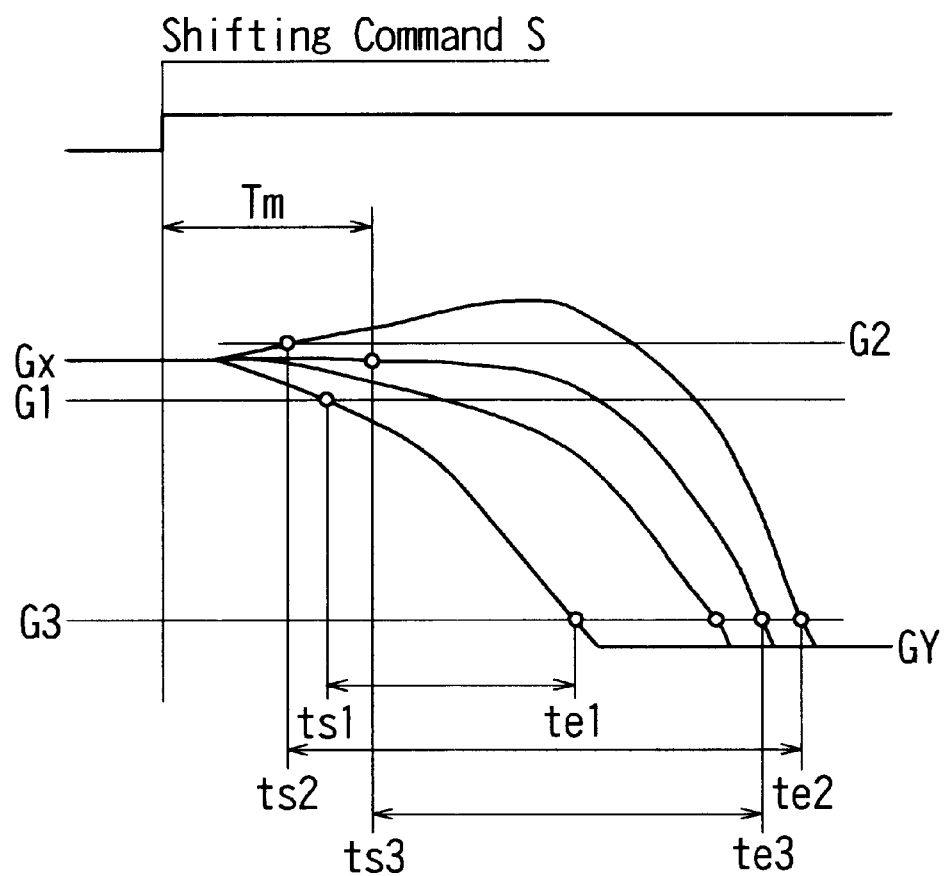
FIG. 4 is a diagram useful in explaining the outline of shift start determination.

In a next step 203, it is determined whether or not the present gear ratio G has reached a shift start determination gear ratio (the first gear ratio) G1, which is set to a value smaller than a before-shifting gear ratio Gx by a predetermined value as shown in FIG. 4.

If the present gear ratio G has reached the shift start determination gear ratio G1, the program proceeds to a step 209, and if not, the program proceeds to a step 204.

In the step 204, it is determined whether or not the present gear ratio G has reached a racing gear ratio (the second gear ratio) G2, which is set to a value larger than the before-shifting gear ratio Gx as shown in FIG. 4 by a predetermined value. If the present gear ratio G has reached the racing gear ratio G2, the program proceeds to the step 209, and if not, the program proceeds to a step 205.

In the step 205, it is determined whether or not a predetermined period of time Tm has elapsed since the output of the shifting command S. If the predetermined period of time Tm has elapsed, the program proceeds to the step 209, and if not, the program proceeds to a step 206.

In the step 206, it is determined whether or not the present gear ratio G has decreased from the previous value by a value equal to or larger than a predetermined unit gear ratio ΔG, If the present gear ratio G has decreased from the previous value, the sequential number count n is increased by 1 in a step 207.

Figure 5:
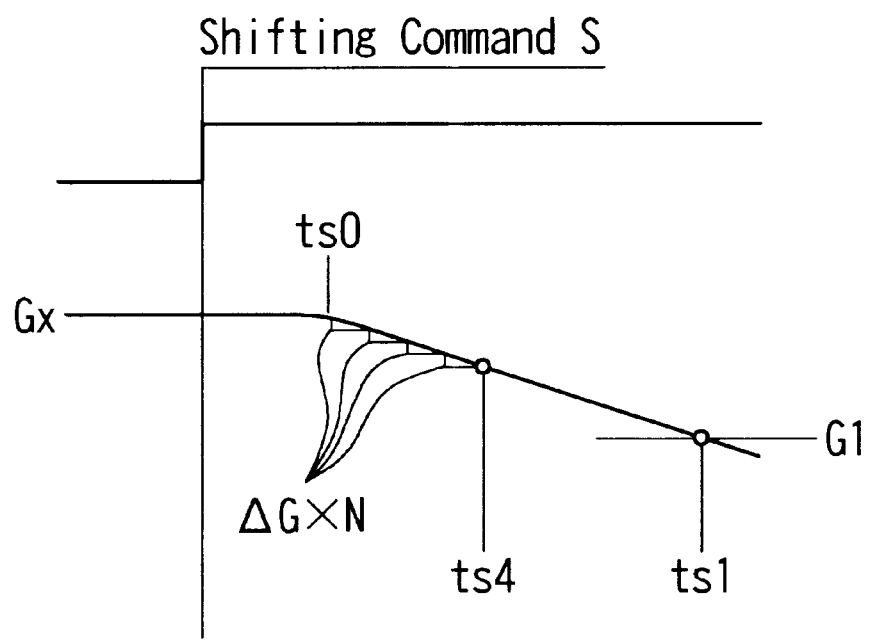
FIG. 5 is a diagram useful in explaining an example of shift start determination based on a sequential decrease in gear ratio.
Figure 6:
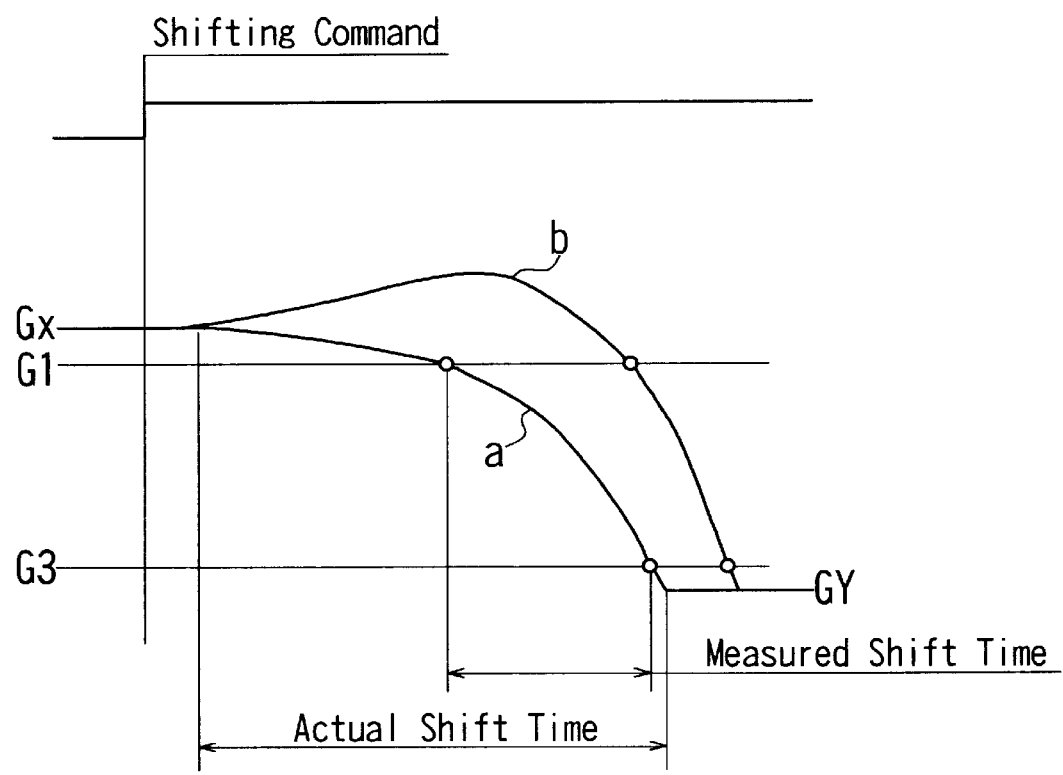
FIG. 6 is a diagram useful in explaining a problem of shift start determination according to a prior art.

FIG. 5 is an enlarged diagram showing the gear ratio between a time point when the shifting command S is outputted and a time point when the shift start determination gear ratio G1 is reached. The unit gear ratio ΔG is set to a value that is single-digit smaller than a difference between the before-shifting gear ratio Gx and the shift start determination gear ratio G1.

In a step 208, it is determined whether or not the sequential number count n has reached a predetermined value N. If the sequential number count n has reached the predetermined value N, it is determined that the shifting has been started and the program proceeds to the step 209. In the step 209, measuring of the shift time is started.

On the other hand, it is determined in the step 206 that the present gear ratio G has increased or that the present gear ratio G has decreased but is still smaller than the unit gear ratio ΔG, the sequential number count n is reset to 0 in a step 212 and the program then returns to the step 202.

After the measuring of the shift time is started in the step 209, it is repeatedly determined in a step 210 whether or not the present gear ratio G has reached a shift end determination gear ratio (the third gear ratio) G3, which is set to a value larger than an after-shifting (target gear position) gear ratio Gy by a predetermined value as shown in FIG. 4.

If the present gear ratio G has reached the shift end determination gear ratio G3, the measuring of the shift time is terminated in a step 211. The measured shift time T is stored as Tb in the step 115 in the main flow chart as described above.

Among the above described steps, the steps 105 to 115 constitute a shift time learning control means of the invention, the step 202 constitutes a gear ratio calculating means, and the steps 203 to step 211 constitutes a shift time measuring means.

It should be noted that the order of the steps 203 to 205 and the steps 206 to 208 may be changed alternately in the procedure.

As a result of the above described steps, if the present gear ratio G has reached the shift start determination gear ratio G1 after the output of the shifting command S as shown in FIG. 4, this time point ts1 is regarded as the shift starting point as in the prior art. If the gear ratio G then crosses the shift end determination gear ratio G3 at a time point te1, a period of time from the time point ts1 to te1 is regarded as the shift time T.

If the present gear ratio G has increased to reach the racing gear ratio G2 although it has not yet reached the shift start determination gear ratio G1, this time point ts2 is regarded as the shift starting point since the present gear ratio G changes from the before-shifting gear ratio Gx. If the gear ratio then crosses the shift end determination gear ratio G3 at a time point te2, a period of time from the time point ts2 to te2 is regarded as the shift time T.

Further, if the gear ratio has decreased sequentially a predetermined number of times by the unit gear ratio ΔG or more as shown in FIG. 5, this time point ts4 is regarded as the shift starting point. If the gear ratio G then crosses the shift end determination gear ratio G3 at a time point te4 (not illustrated), a period of time from the time point ts4 to te4 is regarded as the shift time T.

If the start of shifting is not detected in the above described manners, a time point ts3 at which the predetermined period of time Tm has elapsed since the output of the shifting command S is regarded as the shift starting point, and if the gear ratio G then crosses the shift end determination gear ratio G3 at a time point te3, a period of time from the time point ts3 to te3 is regarded as the shift time T.

According to the prevent embodiment constructed in the above-mentioned manner, the unit gear ratio ΔG is set to a value that is sufficiently smaller than a difference between the shift start determination gear ratio G1 which is conventionally set for the purpose of detecting the start of shifting, and the before-shifting gear ratio Gx, and it is determined whether or not the gear ratio G has repeated decreasing by a value equal to or larger than a predetermined unit gear ratio a predetermined number of times. Therefore, if the gear ratio G changes slowly, the start of shifting can be detected early at the time point ts4 that is much closer to the actual shift starting point ts than the time point ts1 when the gear ratio G decreases to the shift start determination gear ratio G1, as is clear from FIG. 5. Of course, since it is also determined whether or not the gear ratio G has reached the shift start determination gear ratio G1, if the gear ratio decreases rapidly, the start of shifting is detected when the gear ratio G reaches the shift start determination gear ratio G1 without waiting for the gear ratio G to repeat decreasing a predetermined number of times by the unit gear ratio ΔG or more.

If the engine races, it takes much time for the gear ratio G to reach the shift start determination gear ratio G1. However, since it is determined whether or not the gear ratio G has reached a racing gear ratio G2 according to the present embodiment, the start of shifting can be detected earlier at the time point ts2 compared with the prior art in which the start of shifting is detected only by determining whether or not the gear ratio has reached the shift start determination gear ratio.

INDUSTRIAL APPLICABILITY

The above described automatic transmission for vehicle according to the present invention is capable of finding the actual shift time with high accuracy and using it for learning control to thus properly engage and disengage the friction engagement elements and prevent a shift shock even in the case where the gear ratio changes at an extremely low rate at the start of shifting or in the case where the engine races.

What is claimed is:

1. A control device of an automatic transmission, which selectively supplies hydraulic oil pressure to a plurality of friction engagement elements to change a plurality of gear positions by engaging and disengaging the friction engagement elements in combinations, said control device comprising:
   an oil pressure regulating actuator for regulating the oil fluid pressure;
   shift time learning control means for performing shift time learning control by comparing a target shift time and an actual shift time to thereby control said oil pressure regulating actuator; and
   wherein said shift time learning control means comprises gear ratio calculating means for finding a present gear ratio, and shift time measuring means for measuring the actual shift time by determining that shifting is started if the present gear ratio has repeated decreasing by a value equal to or larger than a predetermined unit gear ratio a predetermined number of times.

2. A control device of an automatic transmission, which selectively supplies hydraulic oil pressure to a plurality of friction engagement elements to change a plurality of gear positions by engaging and disengaging the friction engagement elements in combinations, said control device comprising:
   an oil pressure regulating actuator for regulating the hydraulic oil pressure;
   shift time learning control means for performing shift time learning control by comparing a target shift time and an actual shift time to thereby control said oil pressure regulating actuator; and
   wherein said shift time learning control means comprises gear ratio calculating means for finding a present gear ratio, and shift time measuring means for measuring the actual shift time by regarding as a shift starting point an earlier time point between a time point when the present gear ratio has repeated decreasing by a value equal to or larger than a predetermined unit gear ratio a predetermined number of times and a time point when the present gear ratio reaches a first gear ratio that is set to a value smaller than a before-shifting gear ratio by a predetermined value.

3. A control device of an automatic transmission, which selectively supplies hydraulic oil pressure to a plurality of friction engagement elements to change a plurality of gear positions by engaging and disengaging the friction engagement elements in combinations, said control device comprising:
   an oil pressure regulating actuator for regulating the hydraulic oil pressure;
   shift time learning control means for performing shift time learning control by comparing a target shift time and an actual shift time to thereby control said oil pressure regulating actuator; and
   wherein said shift time learning control means comprises gear ratio calculating means for finding a present gear ratio, and shift time measuring means for measuring the actual shift time by regarding as a shift starting point a time point when the present gear ratio reaches a second gear ratio that is set to a value larger than a before-shifting gear ratio by a predetermined value.

4. A control device of an automatic transmission, which selectively supplies hydraulic oil pressure to a plurality of friction engagement elements to change a plurality of gear positions by engaging and disengaging the friction engagement elements in combinations, said control device comprising:
   an oil pressure regulating actuator for regulating the hydraulic oil pressure;
   shift time learning control means for performing shift time learning control by comparing a target shift time and an actual shift time to thereby control said oil pressure regulating actuator; and
   wherein said shift time learning control means comprises gear ratio calculating means for finding a present gear ratio, and shift time measuring means for measuring the actual shift time by regarding as a shift starting point an earlier time point between a time point when the present gear ratio reaches a first gear ratio that is set to a value smaller than a before-shifting gear ratio by a predetermined value and a time point when the present gear ratio reaches a second gear ratio that is set to a value larger than the before-shifting gear ratio by a predetermined value.

5. A control device of an automatic transmission, which selectively supplies hydraulic oil pressure to a plurality of friction engagement elements to change a plurality of gear positions by engaging and disengaging the friction engagement elements in combinations, said control device comprising:

an oil pressure regulating actuator for regulating the hydraulic fluid pressure;

shift time learning control means for performing shift time learning control comparing a target shift time and an actual shift time to thereby control said oil pressure regulating actuator; and wherein said shift time learning control means comprises gear ratio calculating means for finding a present gear ratio, and shift time measuring means for measuring the actual shift time by regarding as a shift starting point the earliest time point among a time point when the present gear ratio has repeated decreasing by a value equal to or larger than a predetermined unit gear ratio a predetermined number of times, a time point when the present gear ratio reaches a first gear ratio that is set to a value smaller than a before-shifting gear ratio by a predetermined value, and a time point when the present gear ratio reaches a second gear ratio that is set to a value larger than the before-shifting gear ratio by a predetermined value.

6. A control device of an automatic transmission according to claim 2 or claim 5, wherein the unit gear ratio is set to a value smaller than a difference between the before-shifting gear ratio and the first gear ratio.

7. A method for controlling an automatic transmission, the transmission selectively supplies hydraulic oil pressure regulated by an oil pressure regulating actuator to a plurality of friction engagement elements to change a plurality of gear positions by engaging and disengaging the friction engagement elements in combinations, in which shift time learning control is performed by comparing a target shift time and an actual shift time to thereby control said oil pressure regulating actuator; said method comprising:

calculating a present gear ratio; and measuring the actual shift time by determining that shifting is started if the present gear ratio has repeated decreasing by a value equal to or larger than a predetermined unit gear ratio a predetermined number of times.

8. A method for controlling an automatic transmission, the transmission selectively supplies hydraulic oil pressure regulated by an oil pressure regulating actuator to a plurality of friction engagement elements to change a plurality of gear positions by engaging and disengaging the friction engagement elements in combinations, in which shift time learning control is performed by comparing a target shift time and an actual shift time to thereby control said oil pressure regulating actuator; said method comprising:

calculating a present gear ratio;

measuring the actual shift time by regarding as a shift starting point an earlier time point between a time point when the present gear ratio has repeated decreasing by a value equal to or larger than a predetermined unit gear ratio a predetermined number of times and a time point when the present gear ratio reaches a first gear ratio that is set to a value smaller than a before-shifting gear ratio by a predetermined value.

9. A method for controlling an automatic transmission, the transmission selectively supplies hydraulic oil pressure regulated by an oil pressure regulating actuator to a plurality of friction engagement elements to change a plurality of gear positions by engaging and disengaging the friction engagement elements in combinations, in which shift time learning control is performed by comparing a target shift time and an actual shift time to thereby control said oil pressure regulating actuator; said method comprising:

calculating a present gear ratio;

measuring the actual shift time by regarding as a shift starting point a time point when the present gear ratio reaches a second gear ratio that is set to a value larger than a before-shifting gear ratio by a predetermined value.

10. A method for controlling an automatic transmission, the transmission selectively supplies hydraulic oil pressure regulated by an oil pressure regulating actuator to a plurality of friction engagement elements to change a plurality of gear positions by engaging and disengaging the friction engagement elements in combinations, in which shift time learning control is performed by comparing a target shift time and an actual shift time to thereby control said oil pressure regulating actuator; said method comprising:

calculating a present gear ratio;

measuring the actual shift time by regarding as a shift starting point an earlier time point between a time point when the present gear ratio reaches a first gear ratio that is set to a value smaller than a before-shifting gear ratio by a predetermined value and a time point when the present gear ratio reaches a second gear ratio that is set to a value larger than the before-shifting gear ratio by a predetermined value.

11. A method for controlling an automatic transmission, the transmission selectively supplies hydraulic oil pressure regulated by an oil pressure regulating actuator to a plurality of friction engagement elements to change a plurality of gear positions by engaging and disengaging the friction engagement elements in combinations, in which shift time learning control is performed by comparing a target shift time and an actual shift time to thereby control said oil pressure regulating actuator; said method comprising:

calculating a present gear ratio;

measuring the actual shift time by regarding as a shift starting point the earliest time point among a time point when the present gear ratio has repeated decreasing by a value equal to or larger than a predetermined unit gear ratio a predetermined number of times, a time point when the present gear ratio reaches a first gear ratio that is set to a value smaller than a before-shifting gear ratio by a predetermined value, and a time point when the present gear ratio reaches a second gear ratio that is set to a value larger than the before-shifting gear ratio by a predetermined value.

* * * * *